Figure 1:
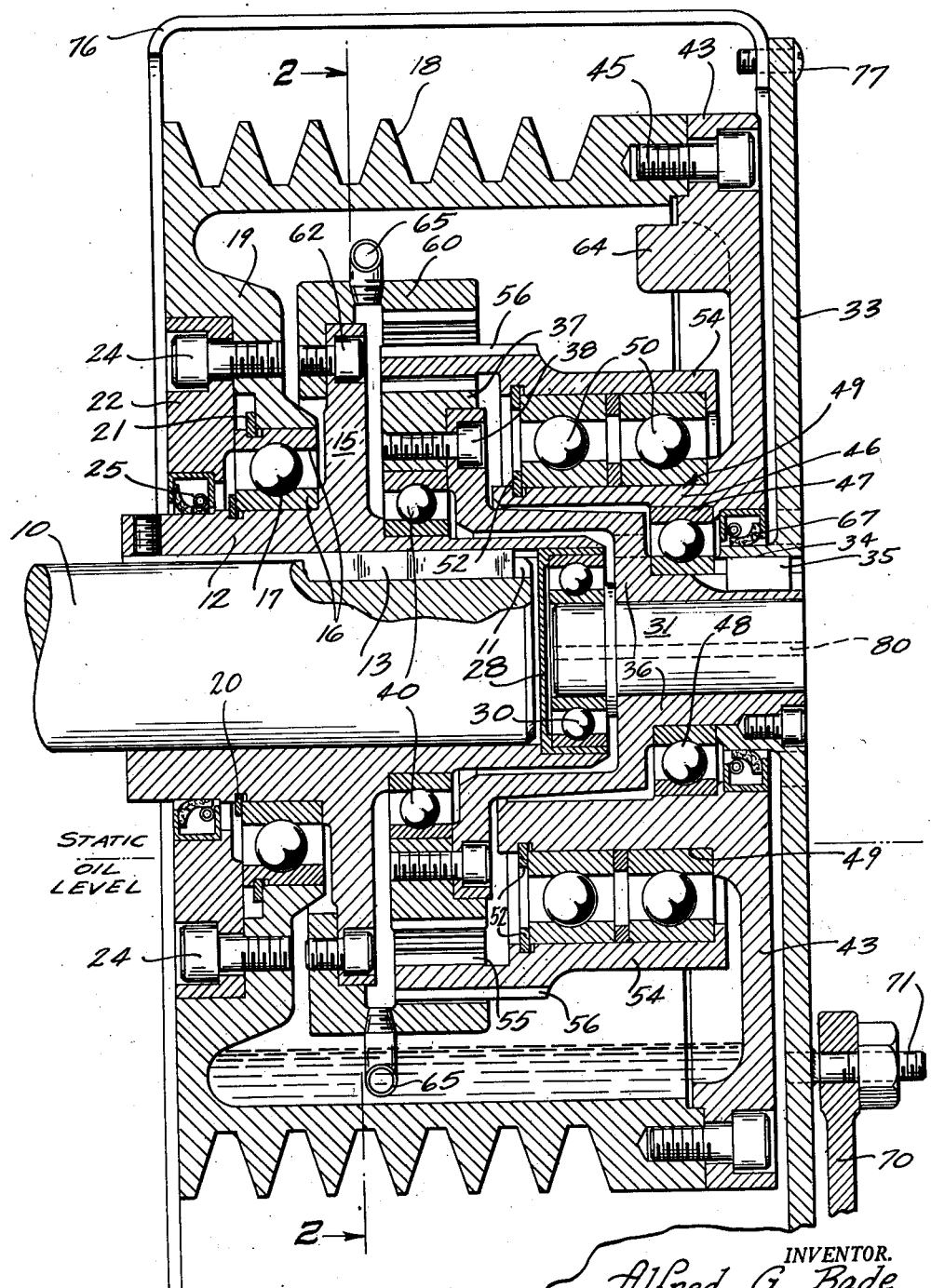

June 11, 1957  A. G. BADE  2,795,155
SPEED REDUCERS

Filed March 4, 1953  2 Sheets-Sheet 2

INVENTOR.
Alfred G Bade
BY
Eugene K. Simpson
Attorney

United States Patent Office 2,795,155
Patented June 11, 1957

2,795,155

SPEED REDUCERS

Alfred G. Bade, Wauwatosa, Wis., assignor to The Falk Corporation, Milwaukee, Wis., a corporation of Wisconsin Application March 4, 1953, Serial No. 340,272

5 Claims. (Cl. 74—805)

This invention relates to speed reducers, and more particularly to a speed reducer adapted for use in connection with a pulley and belt.

It is an object of the present invention to provide a reducing gear which will decrease bending stresses in the driven shaft.

Another object of the invention is to provide a reduction gear which will insure adequate lubrication for all moving parts.

Another object is to provide a self-contained reduction gear which will retain oil without leaking.

A further object of the invention is to provide a reduction gear adapted to be driven by a belt, or the like, which comprises a completely self-contained unit.

A further object of the invention is to provide an adequate lubricating system for a self-contained motor reduction gear.

A further object is to provide a self-contained reduction gear within a drive pulley.

A still further object is to provide a speed reducer in which the gear ratio may be changed readily.

Another object is to provide a self-contained planetary gear having an improved bearing arrangement.

A further object of the invention is to provide a reduction gear for driving a shaft from a motor which will be more efficient than those now in use.

A still further object of the invention is to provide a reduction gear which may be more economically manufactured.

A still further object of the invention is to provide a reduction gear which will be trouble free.

Still further objects of the invention will become apparent upon considering the following specification, which when taken in conjunction with the accompanying drawings illustrates a preferred form of the invention.

Figure 2:
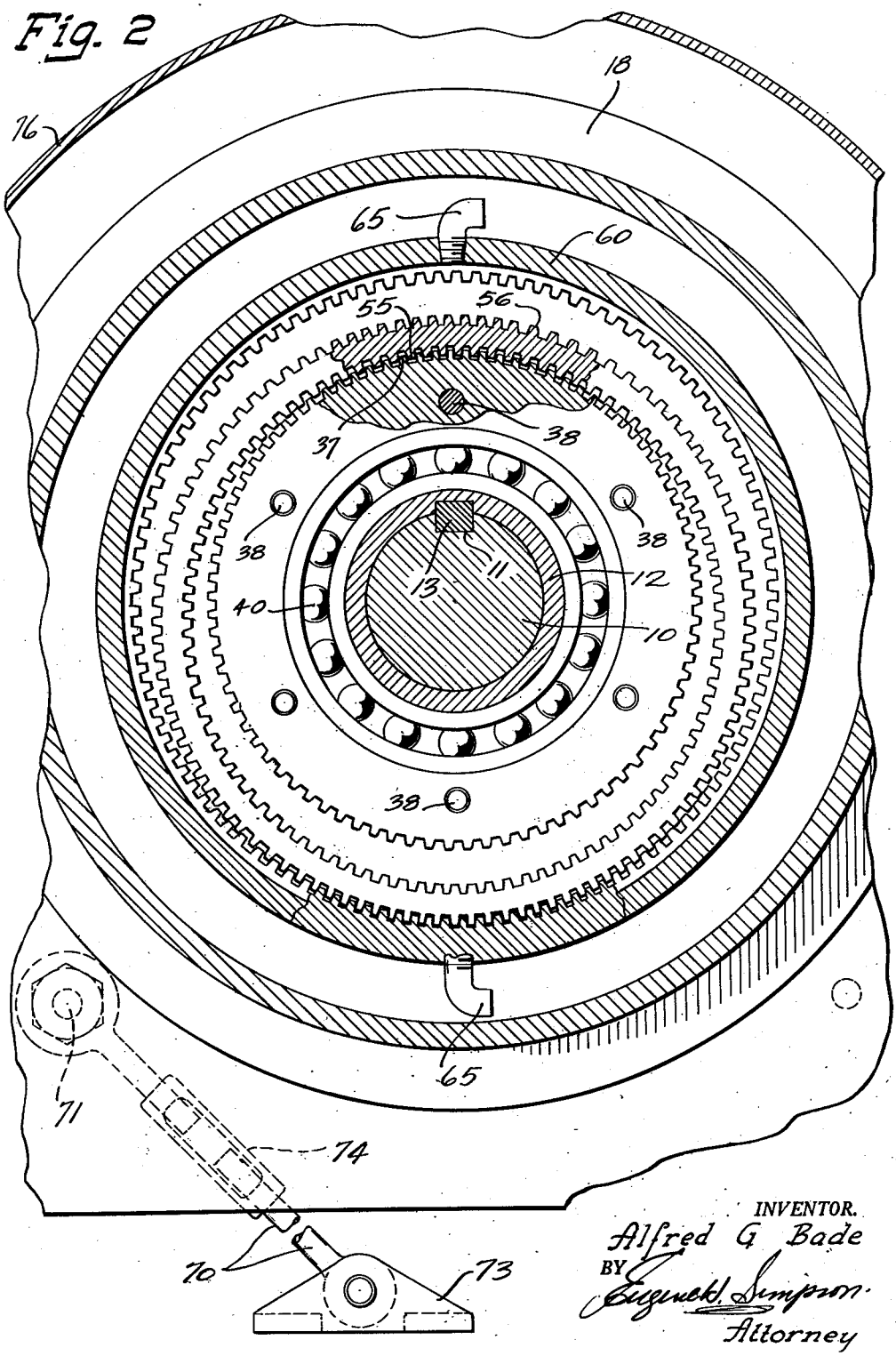

In the drawings:

Fig. 1 is a longitudinal cross-sectional view through the center of the driven shaft, illustrating the principles of the present invention; and Fig. 2 is a cross-section taken on the line 2—2 of Fig. 1, looking in the direction of the arrows.

Referring to the drawings, a shaft 10 constitutes the driving shaft of a piece of machinery (not shown) and contains a key-way 11. The shaft 10 is received within a hollow power output shaft or sleeve 12, and is held therein by a key 13.

The sleeve 12 has an outstanding annular ring 15 intermediate the ends thereof. Ball bearing races 16, containing balls 17, are mounted on the exterior of the sleeve 12 and support the inner end of a rotary power input structure herein shown as a multiple V-belt pulley 18. The races 16 are held in position on the sleeve 12 and the hub of the V-belt pulley 18 by snap rings 20 and 21.

A closure ring 22 is secured to the hub 19 of the pulley 18 by means of a plurality of cap screws 24 suitably counter-sunk in the ring 22.

An annular oil seal 25 is held in engagement with the sleeve 12 and prevents passage of the oil out of the casing.

The inner end of the sleeve 12 receives a bearing cup 28 sweated in place so as to prevent the passage of oil between the cup 28 and the sleeve 12. The cup 28 contains a ball bearing 30 which supports the inner end of a stub shaft 31.

The stub shaft 31 carries an anchor plate 33 forming a cover for the speed reducer. The anchor plate 33 has an opening 34 concentric with the shafts 10 and 31 and receives a hub 36 of a stationary or sun gear 37. The anchor plate 33 and the hub 36 are secured together by a key 35 so as to prevent rotation of the sun gear 37 relative to the anchor plate 33.

The gear 37 is attached to a vertical face of the hub 36 by a plurality of cap screws 38. The gear 37 is supported directly beneath the gear 37 by ball bearings 40 which run in a race concentric with the shaft 12 on which it is thus journalled.

The outer end of the V-belt pulley 18 has a closure plate 43 which is connected about the periphery of the pulley by a plurality of cap screws 45 with a gasket (not shown) interposed between the plate 43 and the end of the pulley 18.

The plate 43 has an inwardly projecting sleeve 46 formed at the central portion thereof and defining an opening 47 which is concentric with the shaft 10 and contains ball bearings 48 which support the inner end of the plate 43 from the hub 36 of the sun gear 37.

The exterior of the sleeve 46 is annular in shape, as seen at 49, and is eccentric to the shaft 12.

The annular eccentric 49 has a pair of ball bearings 50—50 mounted in races and held by snap rings 52. The bearings 50—50 support the hub 54 of a planetary ring gear which has an inside gear portion 55 and an outside gear portion 56.

As the V-belt pulley 18 rotates about the shaft 12 as an axis, the eccentric surface 49 causes the planetary gears 55-56 to engage the teeth of the sun gear 37 on the low side of the eccentric surface 49, and simultaneously to engage the teeth of a ring gear 60 on the high side of the eccentric surface 49.

The gear 60 is mounted on the outstanding annular ring 15 concentrically with the shaft 12 by means of a plurality of counter-sunk cap screws 62 so as to rotate with the shaft 12.

Thus rotation of the V-belt pulley 18 rotates the bearings 50—50, which causes relative rotation between the gears 55, 56 and 60, the gear 60 being connected to drive the shaft 10 through the shaft 12 and the key 13.

The amount of speed reduction involved in the planetary gearing 37, 55, 56 and 60 depends on the number of teeth in the various gears, and may be determined by well-known formulas.

In order to counteract the eccentricity of the planetary gears 55—56 and the hub 54 a counter weight 64 is formed on the closure plate 43 opposite the low side of the eccentric sleeve 46.

Oil scoops 65—65 are formed of pipes projecting through the ring gear 60 and bent at right angles adjacent their outer ends so as to scoop oil from the bottom of the casing when the gear 60 travels in either direction. Oil is retained in the casing by means of the packing 25 on the inner end and by a similar packing 67 at the opposite end of the pulley.

Reaction torque generated by the turning of the planetary gears 55—56 and 60 is absorbed through the plate 33 by means of a tie-rod 70 secured on the plate 33 by a stud 71 and fastened to a solid foundation, such as a floor, by means of a fixture 73. A turn buckle 74, Fig. 2, provides for adjustment in length of the tie-rod 70.

In order to guard against accidents a shield 76 may surround the upper part of the V-belt pulley and be fastened about its outer periphery by machine screws 77.

An air vent 80 may be provided axially through the stub shaft to relieve pressure due to heating within the pulley.

Operation

In operation the gear reducer is keyed onto the shaft 10 by means of a key 13 so that the reducer drives the shaft 10. A plurality of V-belts are adjusted on the pulley 18 and on a corresponding pulley mounted on the prime mover (not shown).

Rotation of the pulley 18 causes the planetary gears 55—56 to gyrate in planetary fashion about the shaft 12 and causes the teeth of the gear 55 to engage the teeth of the sun gear 37 which being stationary causes the gears 55—56 to rotate about the hub 46. Simultaneously the teeth of the gear 56 engage the teeth of the ring gear 60 at points diagonally opposite the points of engagement of the gears 37 and 55 causing the gear 60 to rotate and drive the sleeve 12 and the shaft 10.

As the gear 60 rotates the scoops 65 move through oil which is carried in the outer portion of the V-belt pulley to force oil into all the bearings and through all gears in the speed reducer.

It will be noted that the present construction provides a minimum stress on the driven shaft by transferring the belt tension directly to the shaft without overhang. The bearings likewise are located close to the driven shaft and transmit stress directly to the shaft.

The present construction permits the use of large bearings 50—50 supporting the eccentric or planetary gear thus insuring adequate bearing surfaces for the speed reducer by avoiding centrifugal effect on the balls, such as is an inherent condition in previous planetary drives.

It will be realized that the hereinbefore described form of the invention is to be taken merely as a preferred embodiment thereof, and that various changes in size, shape and arrangement of parts may be made without departing from the spirit of the invention or the scope of the subjoined claims.

That which is new and is desired to be secured by United States Letters Patent is:

1. A speed reducer of the character described comprising, a sleeve, means to secure a shaft to be driven within said sleeve, a bearing cup fixed in the inner end of said sleeve, a bearing within said cup, a stub shaft journaled within said bearing, a stationary sun gear having a hub thereon mounted on said stub shaft, a bearing carried by said hub, a second bearing carried by said sleeve, an enclosed pulley mounted between said last two bearings and adapted to rotate thereon, an eccentric surface on the interior of the said pulley, a bearing on said eccentric, a planetary gear mounted on the last named bearing, gear teeth on the interior of said planetary gear engaging teeth on the sun gear, teeth on the exterior of said planetary gear, and a ring gear connected with said sleeve, said ring gear having a plurality of interior teeth engaging the exterior teeth of the planetary gear at a point diametrically opposite the point of engagement of the teeth of the planetary gear with the sun gear whereby the sleeve is driven by the pulley.

2. In a speed reducer of the character described, a sleeve, a shaft carried in said sleeve and adapted to be driven thereby, a ring gear carried by said sleeve and concentric therewith, a bearing cup formed in the inner end of said sleeve, a bearing in said cup, a stub shaft concentric with said sleeve and mounted within said bearing, a stationary sun gear having a hub mounted on said stub shaft, a bearing concentric with said shaft mounted on the exterior of said hub, a second bearing carried by said sleeve, a pulley comprising a plurality of V-belt sheaves journalled between said last two named bearings, a cover plate for the open end of said pulley, an inwardly projecting sleeve formed on said cover plate having a cylindrical surface journalled on the exterior of the sun gear, an eccentric surface on the exterior of said last named sleeve, and a planetary gear journalled on the eccentric surface of said sleeve, said planetary gear being engageable with said sun gear and said ring gear simultaneously whereby power is transmitted from the pulley through the gears to the first named sleeve.

3. A speed reducer of the character described, comprising, a sleeve, means to secure a shaft to be driven within said sleeve, a stub shaft mounted concentrically with said sleeve, a stationary sun gear having a hub thereon mounted on said stub shaft, a bearing carried by said hub, a second bearing carried by said sleeve, an enclosed pulley mounted between said last two bearings and adapted to rotate thereon, a fixed eccentric surface disposed within said pulley, a bearing on said eccentric, a planetary gear mounted on the last named bearing, gear teeth on the interior of said planetary gear engaging teeth on the sun gear, teeth on the exterior of said planetary gear, and a ring gear connected with said sleeve, said ring gear having a plurality of interior teeth engaging the exterior teeth of the planetary gear at a point diametrically opposite the point of engagement of the teeth of the planetary gear with the sun gear whereby the sleeve is driven by the pulley.

4. A reduction pulley as defined in claim 3 including means to secure the sun gear against rotation.

5. A reduction pulley as defined in claim 2 including an anchor plate connected with the hub of the sun gear and means to secure the anchor plate against rotation.

References Cited in the file of this patent

UNITED STATES PATENTS

| 595,103 | Hutchins et al. | Dec. 7, 1897 |
| 1,215,614 | Brown | Feb. 13, 1917 |
| 2,434,082 | Sharpe | Jan. 6, 1948 |

FOREIGN PATENTS

| 418,342 | Italy | Feb. 15, 1947 |
| 457,026 | France | Sept. 10, 1913 |
| 569,679 | Great Britain | June 4, 1945 |
| 663,210 | Great Britain | Dec. 19, 1951 |